US006934739B2

United States Patent
Pietilä

(10) Patent No.: US 6,934,739 B2
(45) Date of Patent: Aug. 23, 2005

(54) SYSTEM FOR CONTACT SERVICES UTILIZING A LOCAL CONTACT SERVER AND CONTACT DEVICES

(76) Inventor: Ilmo Pietilä, Espoo (FI)

( * ) Notice: Subject to any disclaimer, the term of this patent is extended or adjusted under 35 U.S.C. 154(b) by 810 days.

(21) Appl. No.: 09/848,264

(22) Filed: May 4, 2001

(65) Prior Publication Data

US 2002/0165919 A1 Nov. 7, 2002

(51) Int. Cl.[7] .............................................. G06F 15/16
(52) U.S. Cl. ...................................... 709/207; 709/202
(58) Field of Search ................................ 709/207, 202; 455/41.2; 705/9, 1

(56) References Cited

U.S. PATENT DOCUMENTS

| | | | | |
|---|---|---|---|---|
| 5,884,272 A | * | 3/1999 | Walker et al. | 705/1 |
| 5,920,845 A | * | 7/1999 | Risemberg | 705/1 |
| 5,963,951 A | * | 10/1999 | Collins | 707/102 |
| 6,272,467 B1 | * | 8/2001 | Durand et al. | 705/1 |
| 6,480,885 B1 | * | 11/2002 | Olivier | 709/207 |
| 6,690,918 B2 | * | 2/2004 | Evans et al. | 455/41.2 |
| 6,735,568 B1 | * | 5/2004 | Buckwalter et al. | 705/1 |
| 2002/0194049 A1 | * | 12/2002 | Boyd | 705/9 |

* cited by examiner

*Primary Examiner*—John Follansbee
*Assistant Examiner*—Jungwon Chang
(74) *Attorney, Agent, or Firm*—Young & Thompson

(57) ABSTRACT

A system for contact services enables face-to-face contacts between two or more persons immediately or almost immediately when their profiles match, i.e. they have similar requirements or interests. The system includes at least two devices termed "contact device". Each person, who wishes to use a contact service, carries a contact device with him/herself. Each contact device is equipped with a low-powered receiver for receiving information and an alarm which signals when the person's profile and another person's profile match. The contact device signals, for example, by beeping, by vibrating, or by blinking a small-sized light. By using a contact server it is possible to enlarge the area from which persons may receive either profiles or information concerning matching profiles. Profile mediators are intended for transmitting person's profile and the state information to the contact server.

11 Claims, 1 Drawing Sheet

SYSTEM FOR CONTACT SERVICES UTILIZING A LOCAL CONTACT SERVER AND CONTACT DEVICES

FIELD OF THE INVENTION

The present invention generally relates to a system providing different kind of contact services.

BACKGROUND OF THE INVENTION

Throughout history human beings have tried to contact persons who meet their requirements and to avoid contacting persons who waste their time. This especially concerns marriage, but also other kind of human relationships. People have always gone parties where they can eat and dance and talk with each other, for example. Some parties are intended only for singles, but mostly parties are intended for everyone who likes to enjoy social life. People have different backgrounds, living habits etc. and they have different expectations and requirements concerning persons whom they would like to contact and with whom they like to spend time. Some people are shy or they have some other difficulties in expressing themselves. Restaurants are popular places for men and women to meet, but it may take time and money to find an interesting person in a restaurant.

In the Internet age it is, in principle, easier to contact a person who fulfils one's requirements. It is possible to use different kinds of dating services via the Internet. Those dating services are explained in the following paragraph.

A person, who likes to introduce him/herself through a dating service, browses by an Internet browser to the web site providing the dating service. Then the person fills an electronic form termed a "profile". A profile includes questions concerning the person's own age, height, education, hobbies, favourite food, a favourite radio channel etc. In addition, the profile includes at least one text field in which the person describes what kind of person he or she is looking for. The profile also includes contact information, such as an email address. When the profile is filled, the dating service adds it to a set of profiles. The dating service contains means for selecting the profiles from the set of profiles. Another person, who wants to check out the profiles, browses to the web site of the dating service. Then the person fills an electronic form for a search and the dating service searches the profiles that match the electronic form filled.

When comparing restaurants with the dating services the following advantages and drawbacks can be found.

In restaurants the people can see each other and maybe touch each other on a dance floor. Thus, the advantage of the restaurants is that people can at once see each other's appearance, and if they talk, they can at once hear each other's manner of speaking. The drawback is that finding an interesting person and starting a conversation with him or her may be exhausting.

In a dating service a person, who gives his/her profile to the service, can describe with many words, if needed, themselves and their expectations. And people, who are checking out the profiles, can easily pick up the most interesting profiles. Thus, the advantage of the dating service is that, the people can express their expectations straight without being discourteous. The drawback is that the first contact to a person is virtual, i.e. a profile with contact information, such as an email address. After emailing it might be possible to meet the owner of the profile.

Of course, the restaurants are just one place to meet people. There are different kinds of clubs and hobbies in which people can meet each other and possibly find a desired partner. There are also available Internet services which differ somewhat from the dating service described. However, the drawback of the prior art is that there is no system able to provide face-to-face contact between two persons so that said persons would know that their profiles match.

SUMMARY OF THE INVENTION

The objective of the invention is to provide a system for a new type of contact service. The system enables a face-to-face contact between two persons immediately or almost immediately when their profiles match. The system includes at least two short-range radio devices termed "contact device". Each person, who is using a contact service, carries a contact device. Each contact device is equipped with a low-powered transmitter and receiver for transmitting and receiving information and an alarm that notifies when the person's profile and another person's profile match. The contact device alarms, for example, by beeping, by vibrating or by blinking a small-sized light.

Hence, the system includes contact devices each of which having a transmitter, a receiver, an alarm, a processor, and a memory. Each contact device further includes a power-supply, such as accumulator or a battery, and means for inputting profile information into the memory. The inputting means can be, for example, a keyboard, or a port to a device having a keyboard. A contact device may also have a small-sized display.

Thus, each contact device is capable of storing profiles, transmitting a person's own profile, receiving other persons' profiles, comparing the other persons' profiles with the person's own profile, and signaling if the profiles match.

Due to the short radio range the persons, whose profiles match, should be close enough to each other. Then they can hear not only the alarm tone of their own contact device, but also the alarm tone of another's contact device. Thus, the persons have to be within a certain audibility range.

Alternatively, if each contact device is equipped with the small-sized blinking light, the persons have to see each other's blinking lights. Thus, the persons have to be within a certain visual range.

However, it is not necessary that the persons have to be at once inside of the certain audibility or visual range. There can be a certain meeting point to which the persons walk when their contact devices alarm. In the meeting point the persons are close enough to notice each other.

If required, each contact device can be equipped with a small-sized display for showing information. Then the contact device of a person could show on its display, for example: "Cindy, Moonpath". This information could mean that a person should go the meeting place having the name "Moonpath" to meet a person having the name "Cindy".

The system may further include a contact server that is able to transmit the person's profile to a much wider area than the contact device's transmitter can. The contact server includes means for inputting or means for transferring profile information into the system, means for storing the profiles, and means for comparing the profiles. The contact server may transmit all the profiles stored in it, or it may find the matching profiles and transmit only the matching profiles.

If the system includes a contact server, it may further include at least one profile mediator that mediates profiles, through its powerful transmitter, from the contact devices to the contact server.

BRIEF DESCRIPTION OF THE DRAWINGS

The invention is described more closely with reference to the accompanying drawings, in which.

DETAILED DESCRIPTION OF THE INVENTION

Figure 1:
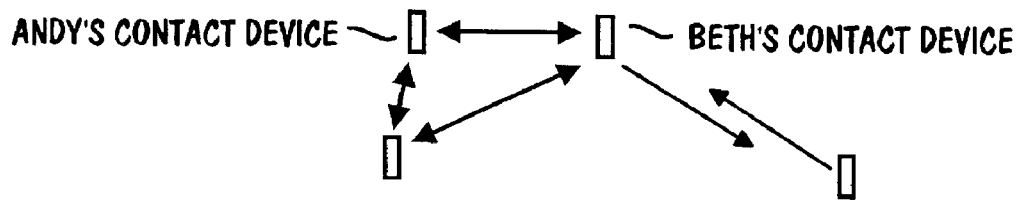
FIG. 1 depicts the usage of the contact devices.

FIG. 1 depicts the usage of contact devices. Each short-range contact device is sending continuously or periodically the profile that the owner has loaded into the memory of the device. At the same time each contact device is receiving profiles sent by other contact devices. Due to the short radio range a receiving contact device must be near enough to a sending contact device. Bluetooth is a preferable radio technique for contact devices.

Bluetooth is a global de facto standard for wireless communication. The standard is made by the Bluetooth special interest group, which is an industry group consisting of leaders in the telecommunications, computing, and networking industries. When two Bluetooth equipped contact devices come within a 10 meters range of each other, they can establish a connection together. This connection is based on a low-cost, short-range radio link, thus the connection is possible without a line-of-sight.

In FIG. 1, four contact devices are shown transmitting a person's profile and three of those are receiving other persons' profiles. One contact device is too far to receive profiles. One contact device belongs to a fictitious person, Andy, and another to a fictitious person, Beth. Andy and Beth receive each other's profiles whereupon contact devices perform a matching operation. If the profiles match, the contact devices notify Andy and Beth by signalling.

To make the matching operation possible, the profiles need to be somehow standardized. For example, if a requirement is that a person's height should be 160–175 cm, a person who is 170 cm long fills the requirement. A computer program detects this easily. Conversely, if a requirement is that the person should be "smart and cute", and a person regards oneself as "sharp and funny", it is more or less unclear whether the requirement is filled or not. This kind of comparing is difficult particularly for a computer program. Thus, it is preferable that e.g. a person's character is described by a standardized manner in the person's profile. For example, there could be ten features which describe a person's character, and a person could be allowed to choose at most four of those features. Then "sharp and funny" persons should choose at least the features "intelligent" and "charming".

A contact device can be equipped with means for adjusting the matching percent. The matching percent can be initially 100%, thus meaning that all the compared pieces of information in the profiles, such as height, have to match. If the matching percent is X then at least X % of the compared pieces of information have to match. A contact device may include, for example, a rocker switch for adjusting said percent between 1–100%. Then a user can increase or decrease the matching percent by using the rocker switch.

Especially in dating services, a profile usually includes a part in which a person describes himself/herself and another part in which the person describes his/her requirements. It is possible that, for example, Beth's own description meets Andy's requirements but Andy's own description does not meet Beth's requirements. This can be termed a "one-sided match". However, in the claims of the present application the term "match" refers to any kind of match, including a one-sided match and match between 1–100%.

Figure 2:
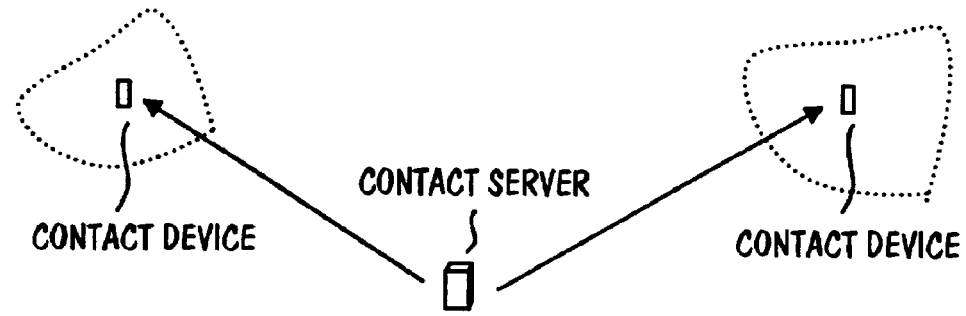
FIG. 2 depicts the usage of the contact server.

FIG. 2 depicts a contact server transmitting information to the contact devices. There are two contact devices. Dash lines describe the transmission area of the contact devices. The owners of said contact devices have transferred their profiles to the contact server that is connected to a powerful transmitter. The contact server transmits either all the profiles stored in its memory or only the matching profiles. The contact devices receive the profiles transmitted, compare the profiles, and find the matching profiles.

If required, the contact device may signal by a first way when a person having the matching profile is near and by a second way when said person is far. If said person is far, the persons having the matching profiles should go to a certain meeting point where they will notice each other. If the persons taking part in the contact service have mobile phones with them, the display of the contact device can be used for showing a phone number. Then the person getting a phone number can call to said number and make an appointment with the other person having the matching profile.

Figure 3:
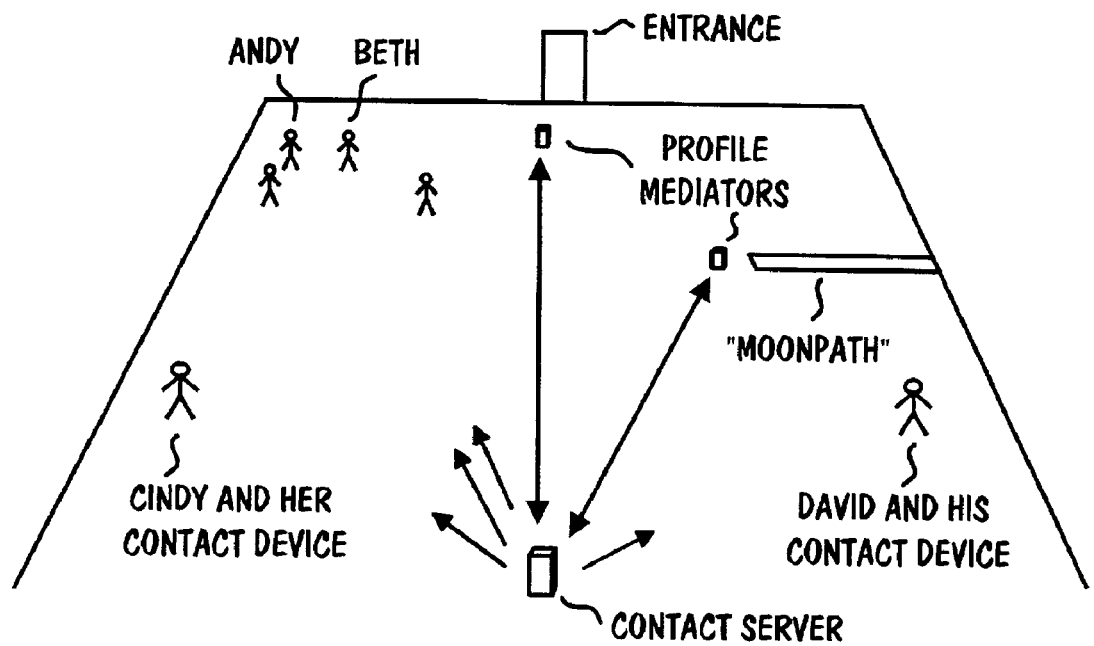
FIG. 3 shows an example of the usage of the system.

FIG. 3 shows an example of the usage of the system. The place in the figure is a restaurant and a contact service provided by the system is intended for dating. Andy, Beth, Cindy and David have filled their profiles and they carry contact devices with them. The system detects that Andy's and Beth's profiles match and informs them. Also Cindy's and David's profiles match, but they are so far from each other that they cannot see each other. Thus, the system sends a message "David, Moonpath" to Cindy and another message "Cindy, Moonpath" to David. Then they walk to a meeting point addressed by the system; the meeting point is in this case "Moonpath".

It is possible that there are simultaneously many matching profiles. For example, Cindy could have matching profiles with David and Andy. For this kind of case, the contact devices can be equipped with means for setting on and off a "busy" state. In addition, the contact device can be adapted to signal by a third way when both the persons have set the "busy" state on. The "busy" state is useful for two reasons. First, the persons want to use their contact devices to find each other in the meeting point, thus they prefer not to receive another matching profile for the moment. Secondly, when the "busy" state is on, the system skips the matching profiles. For example, if Cindy and David have a meeting, the system skips the matching profiles relating to Cindy and Andy.

FIG. 3 also shows two profile mediators, one beside the entrance of the restaurant and another beside "Moonpath". The following example describes the operation of a profile mediator. When Cindy came in the restaurant, the profile mediator received her profile and mediated it to the contact server. When Cindy walks on "Moonpath" the other mediator informs the contact server that Cindy is busy and when Cindy leaves "Moonpath" said mediator informs the contact server that Cindy is free. When Cindy leaves the restaurant the profile mediator beside the entrance informs the contact server which stops transmitting Cindy's profile.

The profile mediators can mediate persons' profiles and so called state information to the contact server. The state information can be, for example, "log in", "free", "busy", or "log out". The state information can be changed automatically, as in the above example, or the contact device may include a button for changing the state information.

When the state is "log in" the contact server adds the person's profile to the others and sets the state "free". When the profile mediator informs that the person's state is changed to "busy", the contact server stops processing person's profile until person's state is changed to "free". When the person's state is "log out", the system removes the person's profile. The above-mentioned states are only some possibilities of states which may exist and how the states are used. The current state can be included to a person's profile or it can be transmitted as a separated piece of information.

By using its low-powered receiver/transmitter a contact device can communicate independently with other contact devices. Therefore a person having a contact device may, for example, meet on a street another person having a contact device and a matching profile.

By using a contact server it is possible to enlarge the area from which persons may receive either profiles or information concerning matching profiles. Profile mediators are intended for transmitting a person's profiles and the state information to the contact server.

When a contact device is used in a place where a contact server and profile mediators are utilized, the contact device should be adapted to deliver a unique identifier and distinguish its own unique identifier when the contact server transmits profiles or other information to the contact device. The unique identifier can be a number but it can also be a name, or a nickname.

In addition, the contact device should be adapted to distinguish a remote profile, i.e. a profile transmitted by the contact server, from the profile sent by another contact device.

The contact services provided by the system can be different kinds of dating services, but they can also be something else. In addition, in some services it is adequate the many people meet simultaneously when they have matching profiles. For example, when thousands of people participate in a big travel exhibition, it would be desirable that the people would fill in a profile concerning what kinds of travel interest them. Then it would be possible to transmit a message to persons who are interested in e.g. Island. The message could include e.g. information "Island travels, 17.30, A12".

There can be simultaneously different kinds of profiles in a person's contact device. For example, one profile for dating and one profile for the above-mentioned travel exhibition.

To make the matching operation more clear, the profiles stored in the contact devices should have a standardized form. The standardized form for the profiles preferably includes check boxes and numerical requirements rather than fields for freeform text. A profile is created by somehow filling in a certain standardized form. The filling in is preferably performed by using a computer-aided, electronic form.

If profiles are not encrypted, someone may cheat by reading other persons' profiles by an appropriate program and by changing his/her own description so that it meets the requirements of the profiles read. If required, profiles can be encrypted to prevent this kind of cheating. The encryption of profiles is performed in each contact device or in other equipment. The profiles are sent and received in an encrypted form and they are decrypted in a contact device.

FIG. 3 shows one example of, how the contact server and the profile mediators can be located. There the contact server and the profile mediators compose a star network. It is also possible that there is no separated contact server, but the contact server's and profile mediator's functions are located in the same equipment, and that equipment composes a network.

As described above, a contact device includes a receiver and a transmitter. However, a system for contacting services may also include such devices which include only a receiver or a transmitter. Those devices are even cheaper than contact devices. If a device includes only a receiver it cannot operate with another similar device. Correspondingly, if a device includes only a transmitter it cannot operate with another similar device. However, said devices can operate with a contact device so that at least the contact device signals when profiles-match. In addition, a device equipped with a receiver can operate with a contact server or a device equipped with a transmitter.

What is claimed is:

1. A system for contact services, the system including at least two contact devices, wherein each person who uses at least one of the contact services has an own contact device which comprises means for storing at least one profile which describes the person and person's requirements, a low-powered short-range transmitter for transmitting the person's profile to other persons' contact devices, a receiver for receiving another persons' profiles from the another persons' contact devices, means for comparing a profile received with the profile stored in the contact device, means for personally adjusting matching percent which describes how similar the profiles compared have at least to result in signalling an alarm, and means for signalling said alarm when the profiles match; characterized in that the system further comprises a contact server and at least one profile mediator, each of which includes a receiver for receiving profiles from the contact devices via their low-powered short-range transmitters and a transmitter for transmitting the profiles received to the contact server, the said contact server including a receiver for receiving the profiles sent from a profile mediator or the contact devices via their low-powered short-range transmitters, means for storing the profiles received, means for comparing the profiles stored and thus finding matching profiles, and an essentially powerful transmitter for transmitting matching information to the contact devices.

2. The system as described in claim 1, characterized in that the contact device further comprises:

means for showing information in the contact device.

3. The system as described in claim 1, characterized in that the contact device further comprises:

means for encrypting and decrypting profiles.

4. The system as described in claim 1, characterized in that the contact device is adapted to use the Bluetooth technique.

5. The system as described in claim 1, characterized in that the low-powered short-range transmitter is able to transmit at most a distance of 10 meters.

6. The system as described in claim 1, characterized in that the profiles compared have a standardized form.

7. The system as described in claim 1, characterized in that the system further comprises:

means for creating profiles.

8. The system as described in claim 1, characterized in that the contact device is adapted to receive other information than profiles from the contact server.

9. The system as described in claim 1, characterized in that the profile mediator is adapted to communicate bi-directionally with the contact server.

10. The system as described in claim 1, characterized in that the system further includes at least one piece of equipment having the contact server's and profile mediator's functions, each said piece of equipment includes:
   a receiver for receiving profiles,
   means for storing the profiles received,
   means for comparing the profiles stored and thus finding matching profiles, and
   a transmitter for transmitting profiles.

11. A system for contact services, the system including at least two contact devices, wherein each person who uses at least one of the contact services has an own contact device comprising:
   means for storing at least one profile which describes the person and person's requirements;
   a low-powered short-range transmitter for transmitting the person's profile to other persons' contact devices;
   a receiver for receiving another persons' profiles from the another persons contact devices;
   means for comparing a profile received with the profile stored in the contact device;
   means for personally adjusting matching percent which describes how similar the profiles compared have at least to result in signalling an alarm; and
   means for signalling said alarm when the profiles match;
   characterized in that the system further comprises a contact server and at least one profile mediator, each of which comprises:
   a receiver for receiving profiles from the contact devices via their low-powered short-range transmitters; and
   a transmitter for transmitting the profiles received to the contact server;
   wherein said contact server comprises:
   a receiver for receiving the profiles sent from at least one of said at least one profile mediator and the contact devices via said low-powered short-range transmitters;
   means for storing the profiles received;
   means for comparing the profiles stored and thus finding matching profiles; and
   an essentially powerful transmitter for transmitting matching information to the contact devices;
   wherein an entirety of the contact server is physically located within an area that allows for direct bi-directional communication between the contact server and the contact devices via the transmitter and the receiver included the contact server and each of the contact devices.

* * * * *